(12) United States Patent
Forrer et al.

(10) Patent No.: US 7,463,276 B2
(45) Date of Patent: Dec. 9, 2008

(54) DEVICE FOR IMAGING A PRINTING FORM HAVING AN OPTICAL CORRECTION ELEMENT

(75) Inventors: Martin Forrer, St. Gallen (CH); Dzelal Kura, St. Margrethen (CH)

(73) Assignee: Heidelberger Druckmaschinen AG, Heidelberg (DE)

( * ) Notice: Subject to any disclaimer, the term of this patent is extended or adjusted under 35 U.S.C. 154(b) by 163 days.

(21) Appl. No.: 11/359,917

(22) Filed: Feb. 21, 2006

(65) Prior Publication Data
US 2006/0187295 A1  Aug. 24, 2006

(30) Foreign Application Priority Data
Feb. 18, 2005  (DE) .................. 10 2005 007 459

(51) Int. Cl.
*B41J 2/45* (2006.01)
(52) U.S. Cl. .................................... 347/241
(58) Field of Classification Search .................. 347/241
See application file for complete search history.

(56) References Cited

U.S. PATENT DOCUMENTS

| | | | |
|---|---|---|---|
| 5,619,245 A | 4/1997 | Kessler et al. | |
| 5,629,791 A | 5/1997 | Harrigan | |
| 5,646,674 A | 7/1997 | Bacon et al. | |
| 5,841,463 A | 11/1998 | Debesis et al. | |
| 5,854,651 A * | 12/1998 | Kessler et al. | 347/241 |
| 5,861,922 A * | 1/1999 | Murashita et al. | 375/240.24 |
| 6,133,566 A | 10/2000 | Yamaguchi | |
| 6,166,759 A | 12/2000 | Blanding | |
| 6,937,262 B2 * | 8/2005 | Ernst et al. | 347/244 |

FOREIGN PATENT DOCUMENTS

| | | |
|---|---|---|
| DE | 197 22 592 A1 | 12/1997 |
| DE | 103 24 210 A1 | 1/2004 |
| DE | 10 2004 024 710 A1 | 1/2005 |

\* cited by examiner

*Primary Examiner*—Huan H Tran
(74) *Attorney, Agent, or Firm*—Laurence A. Greenberg; Werner H. Stemer; Ralph E. Locher

(57) ABSTRACT

A device for imaging a printing form in a printing form exposer, has at least one laser diode bar which has a number of laser diodes, which are each disposed along a line with nonuniform positional deviation. A spacing of the positions projected onto the line of two adjacent laser diodes differ from an intended spacing. An optical correction element is provided for changing a course of a light beam emitted by one of the adjacent laser diodes such that, downstream of the optical correction element, the beam courses of the emitted light from the two adjacent laser diodes follow the courses of two light beams from adjacent virtual laser diodes whose positions projected onto the line have a different or other spacing along the line, which have a smaller deviation in relation to the intended spacing than the spacing or is equal to the intended spacing.

14 Claims, 4 Drawing Sheets

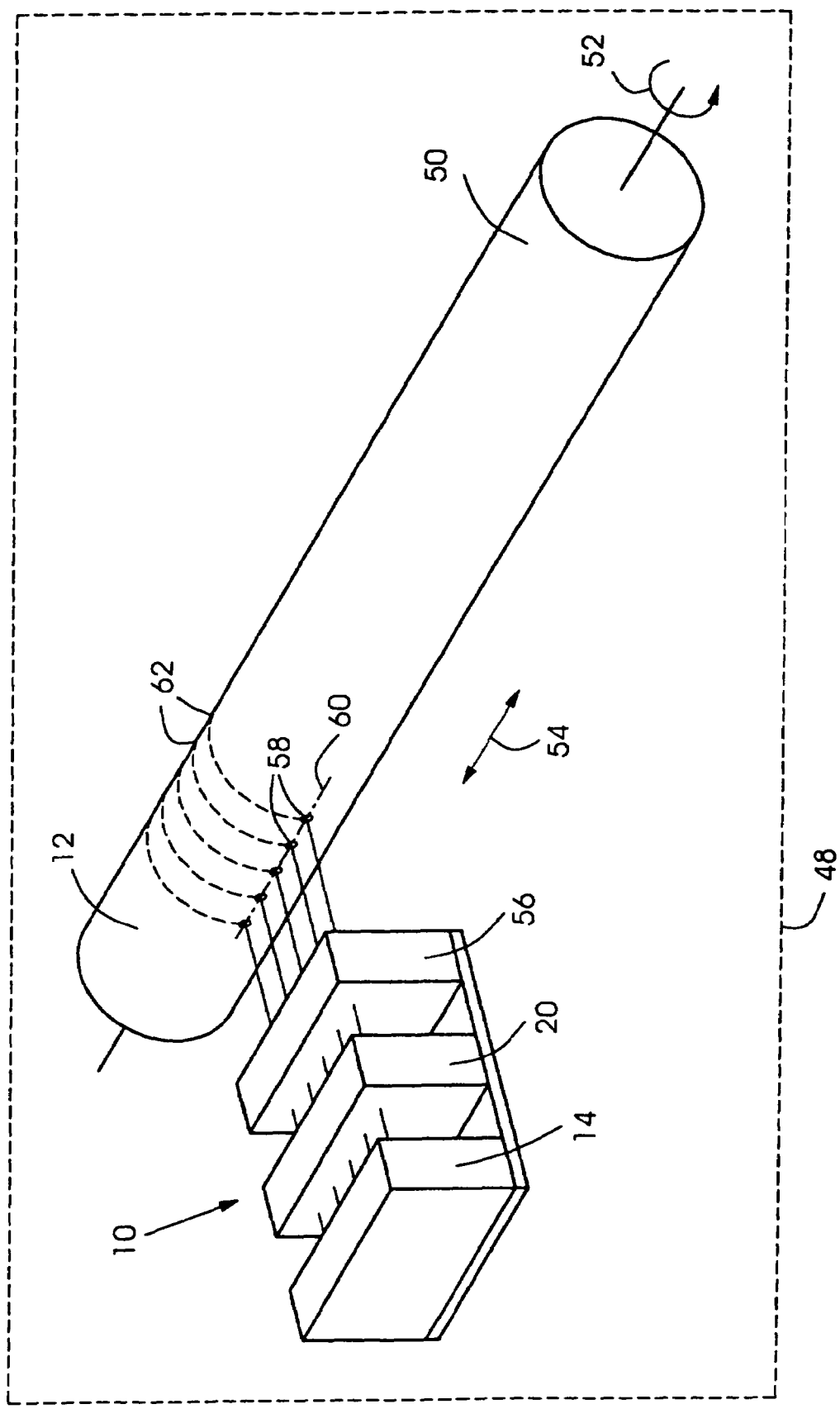

DEVICE FOR IMAGING A PRINTING FORM HAVING AN OPTICAL CORRECTION ELEMENT

BACKGROUND OF THE INVENTION

Field of the Invention

The invention relates to a device for imaging a printing form and having at least one laser diode bar which has a number of laser diodes. The laser diodes are each disposed along a line with nonuniform positional deviation, the spacing of the positions projected onto the line of two adjacent laser diodes differing from an intended spacing. The device further has at least one optical correction element for changing at least one course of a light beam emitted by one of the adjacent laser diodes.

During the imaging or structuring of a printing form or of a printing form precursor or of a printing form blank or of a printing plate (in the following illustration, in order to simplify the notation, all printing surface carriers to be imaged will always be designated a printing form for short), in particular for offset printing, in a printing form exposer or by an imaging device of a printing unit in a press by laser beams, high precision of the positions of the image points of the laser beams on the surface to be imaged is necessary. A device which is frequently used for imaging a printing form uses, as light sources, individually activated laser diodes which are disposed on a laser diode bar, also designated a diode laser array, and integrated in a row, whose emitted light beams are transformed by first optics (also known as micro optics) into a desired spot size and a desired spot shape, and imaging optics (also known as macro optics), which project the emitted light beams onto the desired (in particular separate) positions on the printing form. The two-dimensional surface to be imaged, irrespective of whether this is flat or curved, is typically swept over by the image points of the laser beams by the superimposition of two relative movements, quickly in a first direction and slowly in a second direction different from the first. For example, a printing form is held on a cylinder, which is set rotating quickly, and the imaging device is moved slowly, substantially parallel to the axis of rotation, such that the image points of the laser beams scan the surface along helical paths. In particular in the slow scanning direction, the position of each individual image point must deviate, from its intended position only within a specific limit, since otherwise an infringement of this still permissible tolerance can with high probability lead to defects during imaging, such as the production of hairlines or moiré patterns, which are then visible in a disruptive manner in a print printed off from the printing form. In the case of devices used at present for imaging and in the case of lower limits reached at present for printed dot sizes and screen widths, the positions may deviate from the intended positions only by less than 1 micrometer.

During the production of laser diode bars (diode laser arrays integrated on a bar), the position of each individual laser diode can be defined with lithographic accuracy, which typically lies under 0.1 micrometer deviation. However, during the mounting, in particular on a heat sink, for example by soldering on, in an imaging device, the laser diode arrays are subjected to high forces, which lead to distortion of the bar, frequently even in all three spatial directions. For example, after the mounting has been carried out, the row of laser diodes lies along a U-shaped or S-shaped curve.

In the direction of fast scanning of the printing form, in many but not all applications identical with the direction at right angles to the row of laser diodes, a correction to the position of printing dots on the printing form can be achieved by the activation of the laser diodes with a time delay relative to one another, since the image points which the printing dots produce assume different positions on the printing form at different times.

As an alternative to this, it is also possible to use optical correction elements which effect a change in the beam paths of the light emitted by the laser diodes. In U.S. Pat. No. 5,854,651, the optical correction of deviations of the actual positions of laser diodes disposed along a row from their intended positions on a laser diode bar curved by the mounting is described. In order to reduce the deviation of the position in the direction at right angles to the row, in each case an adjustable optical element acts individually on a light beam from a laser diode and permits an individual beam offset in such a way that the image points of all the laser diodes lie on a straight line or path on the surface to be imaged. In one embodiment, the optical correction element has a number of plane-parallel glass plates, in each case a glass plate being assigned to a laser diode. The planes of the glass plates are inclined with respect to the propagation direction of the light beam in order to produce a beam offset of the associated light beam. The inclination is determined by the amount of the offset in order to compensate for the positional deviation, and by the necessary direction.

In U.S. Pat. Nos. 5,841,463 and 6,166,759, for the purpose of the optical correction of deviations of the actual positions of the laser diodes disposed along a row from their intended positions of a laser diode bar curved by the mounting in the direction at right angles to the emission plane of the row, it is proposed to use a curved optical fiber held in a holder as a cylindrical lens acting on all the light beams emitted by the laser diode bar, the curvature of the fiber in the direction at right angles to the emission plane being chosen such that the image points of all the laser diodes lie on a straight line or path on the surface to be imaged.

In the direction along the row of laser diodes (what is known as the longitudinal axis) of a laser diode bar, as has been described, the mounting leads to increases and decreases in size, in particular nonuniformities, in the spacing of adjacent laser diodes. The spacing of adjacent laser diodes is also designated the pitch, and the deviations from a specific intended spacing value the pitch error. The pitch error can be separated into a linear error component, a functional but nonlinear error component (which can be represented or described by a functional relationship), and a statistical error component. If the real position of each individual laser diode with respect to the first laser diode of the row of the laser diode bar is determined and is represented graphically as a function of the position number of the laser diodes along the row, then the linear pitch error describes the deviation of the slope of the linear regression from the slope of that straight line which describes laser diodes with the intended spacing (regular or uniform positional deviation). The nonlinear pitch error describes the deviation of the real position of each individual laser diode from the regression straight line onto the real positions on the mounted laser diode bar and, in many cases, can be described by a simple functional relationship, in particular by polynomials of low order.

In many familiar devices for imaging a printing form, having a laser diode bar, imaging optics for correcting the emission divergence from the laser diodes are disposed directly downstream of the laser light sources. These imaging optics normally contain micro optical components disposed in a field or an array, that is to say optical elements which act on individual light beams emitted by a laser diode and not on all the light beams emitted by the laser diode bar, for example micro lenses, and are therefore also designated micro optics. The imaging optics are used in particular to produce the desired point geometry or spot shape of the image points on the printing form. A pitch error which may be present is intensified or enlarged by such imaging optics, in particular even in the case of error-free micro optics, for physical reasons. Depending on the spot size on the laser facet, the enlargement can typically be a factor 2 to 5. Furthermore, an error which may possibly be present in the configuration of the field of the micro optical components, that is to say spacing deviations between adjacent micro optical components, adds to the pitch error which may be present and, on top of this, is also intensified. Expressed in another way, the deviation of the positions of the laser diodes from the optical axes of the micro optical components can be intensified in an erroneous manner, so that the relative position difference for each emitter is relevant to the overall error. Statistical, nonfunctional and, in addition, very small, in particular negligible errors, are expected of the fabrication methods of micro optical components.

Since a linear pitch error (regular or uniform positional deviation) merely corresponds to proportional scaling of a desired spacing, it can be compensated for by a simple known lens configuration with appropriate magnification or reduction. The correction of the statistical pitch error, in particular of the combination of diode laser bar and micro optics, requires optimization of the production process of the components to be mounted and of the mounting of the device for imaging a printing form or of an individual position correction. A priori, however, the remaining statistical pitch error is negligibly small as compared with the functional nonlinear pitch error (nonuniform positional deviations), so that the difficulty consists in correcting the nonlinear pitch error.

SUMMARY OF THE INVENTION

It is accordingly an object of the invention to provide a device for imaging a printing form that has at least one laser diode bar which overcomes the above-mentioned disadvantages of the prior art devices of this general type, in which a nonlinear pitch error, the nonuniform positional deviation of the laser diodes, is reduced or compensated for.

According to the invention, a device for imaging the printing form contains at least one laser diode bar which has a number of laser diodes (in particular individually activated laser diodes), which are each disposed in relation to or along a line with nonuniform positional deviation. The spacing of the positions projected onto the line, in particular projected along the perpendicular onto the line, of two adjacent laser diodes deviate from an intended spacing. The device further has at least one optical correction element for changing at least one course of the light beam emitted by one of the adjacent laser diodes. The optical correction element changes the at least one course or path in such a way that, downstream of the optical correction element, the beam courses of the emitted light from the two adjacent laser diodes are the courses or paths of two light beams from adjacent virtual laser diodes whose positions projected onto the line have a different or other spacing along the line, which has a smaller deviation in relation to the intended spacing than the spacing or is equal to the intended spacing.

Stated simply, without restricting the generality, with respect to an additional spacing which may be present perpendicular to the line, which implies a vertical projection of the position in order to determine the spacing along the line, the optical correction element changes the at least one course in such a way that, downstream of the optical correction element, the beam courses of the emitted light from the two adjacent laser diodes are the course(s) of two light beams from adjacent virtual laser diodes located along the line at a different spacing, which has a smaller deviation from the intended spacing than the spacing or is equal to the intended spacing. Expressed in other words, by the beam course(s) changed by the optical correction element, the light beams appear to come from laser diodes which are located on the line at the different spacing, in particular at the intended spacing. Downstream of the optical correction element, the light beams are propagated as though they have been emitted by laser diodes which are located on the line at the different spacing, in particular at the intended spacing.

For those skilled in the art, it is clear that, with the aid of the invention for the successful correction of the pitch error, it is already sufficient to compensate for or to reduce the functional nonlinear pitch error by use of the optical correction element, in other words to provide uniformly spaced virtual light sources, laser diodes, for the imaging. Although the linear pitch error is also preferably compensated for by the optical correction element, it is entirely possible for the intended spacing mentioned still to be afflicted with a scaling factor (linear pitch error), since it is possible for imaging optics disposed downstream and provided with a compensating magnification factor to be used, as has already been mentioned. Consequently, the optical correction element advantageously compensates for a nonlinear pitch error in a simple way, at least partially, preferably completely. The wrongly positioned light beams can be projected into the theoretically correct or desired positions or courses by the action of the optical correction element.

In advantageous embodiments of the device for imaging the printing form, use can be made of on optical correction element which acts on the courses of the emitted light beams from at least two laser diodes or all the laser diodes on the laser diode bar. The optical correction element can be constructed in form and action such that the functional relationship, determined by measurement or by calculation, of the nonlinear pitch error is compensated for along at least part of the row or along the complete row of laser diodes. A complicated individual correction can be avoided.

The optical correction element can be static or have a fixed, construction-based corrective action. The installation of the correction element can be carried out during mounting as a calibration of the laser diode bar, so that it is not necessary for complicated adjustment measures to be carried out at a customer or user of the imaging device.

The optical correction element can be dynamic or have a variable corrective action depending on the construction, in particular as a result of the shaping or position of the optically active, refractive surfaces. An actuator can be operatively connected to such an optical correction element, so that an influence can be exerted on the shaping or the position if required. The dynamic implementation can be such that individual setting or adaptation can be carried out for each individual light beam from the laser diodes.

The line mentioned in relation to the row of laser diodes of the laser diode bar can have a straight course.

In a preferred embodiment of the device for imaging the printing form, between the laser diode bar and the optical correction element there are disposed imaging optics for correcting the emission divergence, in particular asymmetrical or astigmatic divergence, of the laser diodes. In particular, the imaging optics for correcting the emission divergence can have an array of micro lenses, in each case one of the micro lenses acting on an emitted beam from one of the laser diodes, and contains a cylindrical lens acting on all the emitted beams from the laser diodes of the laser diode bar.

Furthermore, the imaging optics can produce a virtual intermediate image.

Moreover, it is preferred if, in each case, a light beam from an individually actuated diode of an imaging channel of the imaging device is used as a light source. Expressed in another way, the device for imaging the printing form can, with the number of light sources, produce on the printing form the same number of image points which are located separately from one another, do not overlap.

In a particularly advantageous embodiment, the optical correction element is a glass plate clamped in a holder or on a carrier, in particular a thin glass plate. The thickness can be less than or equal to 0.5 mm. The corrective action is then in the sub-micrometer range. Depending on the shape of the holder and the maximum amplitude of the glass plate clamped in the holder, in particular the curved shape of the glass plate, various courses or pitch errors and error amplitudes can be compensated for.

The optical correction element acting on a plurality, preferably all, of the light beams from the laser diodes can have a simply curved course (U-shaped) or a course of the curvature with sections of different sign of the curvature (for example S-shaped or undulating) or planar sections in some portions. The optical correction element can act in each case on one course of the emitted light beam as a plane-parallel plate, that is to say effect an offset of the light beam without changing the orientation of its propagation. Therefore the curvature is so low or small as compared with the spot size of the light beam on the optical correction element that the curvature and therefore the optically induced wavefront error within the spot size is negligible. The course, that is to say the optically active shaping of the optical correction element, is intended to compensate for the nonlinear pitch error and consequently depends on the structural conditions of the laser diode bar to be corrected.

It is particularly advantageous if the optical correction element corrects at least one component of the nonlinear spacing deviation, the component being an approximation to the spacing deviation by a simple functional relationship or an approximation of leading order, that is to say in particular the terms of a polynomial which supply the largest contribution up to an error that can be classified as negligible. If the functional relationship describing the nonlinear pitch error is determined, it can transpire that only one or a few terms supply the main contribution, so that it suffices, without detrimental effect on the quality of the compensation, to compensate for only the main contribution. Strictly speaking, only an approximate functional relationship, that is to say an approximation to the nonlinear pitch error, will then be compensated for. In this way, if appropriate, a single global correction, that is to say an adequate correction acting on a plurality or even on all the laser diodes, can advantageously be made and an individual correction can be dispensed with.

In addition or as an alternative to the features mentioned hitherto, the device can have imaging optics disposed downstream of the optical correction element in order to image the beams from the laser diode bar in a row of image points on a printing form. In particular, the downstream imaging optics can be telecentric. The downstream imaging optics, also designated macro optics, can in particular be imaging optics as described and accessible to the public in published, nonprosecuted German patent application DE 102 33 491 A1, corresponding to U.S. patent disclosure No. 2004-0136094 A1. The disclosure content of DE 102 33 491 A1 and of US 2004-0136094 A1 is hereby incorporated by reference in its entirety in this application and in this illustration.

In particular, the printing form can be held on a cylinder or is formed by the circumferential surface of a cylinder. In this case, the row of image points has an angle different from 90 degrees, preferably substantially 0 degrees, in relation to the direction defined by the cylinder axis.

The device according to the invention for imaging a printing form can be used particularly advantageously in a printing form exposer or a printing unit of a press. Associated with the idea of the invention, therefore, is also a printing form exposer, in particular for offset printing forms, which contains at least one imaging device having features or feature combinations according to this illustration. The printing form exposer can be an external drum exposer or an internal drum exposer. Furthermore, associated with the idea of the invention is a printing unit, in particular an offset printing unit, which contains at least one imaging device having features or feature combinations according to this illustration. A press according to the invention has at least one printing unit according to the invention. The press can be a sheet-fed press, in particular a perfecting press. The press can comprise a feeder, at least one printing unit (typically 4, 6, 8 or 10 printing units), if appropriate a finishing unit (a varnishing unit, a punching unit or the like), and a deliverer. A plurality of imaging devices according to the invention can also be used in a printing form exposer and/or in a printing unit.

Other features which are considered as characteristic for the invention are set forth in the appended claims.

Although the invention is illustrated and described herein as embodied in a device for imaging a printing form that has at least one laser diode bar, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is diagrammatic, perspective view of the topology of the use of the invention in a printing form exposer.

DESCRIPTIPON OF THE PREFERRED
EMBODIMENTS

Figure 1A:
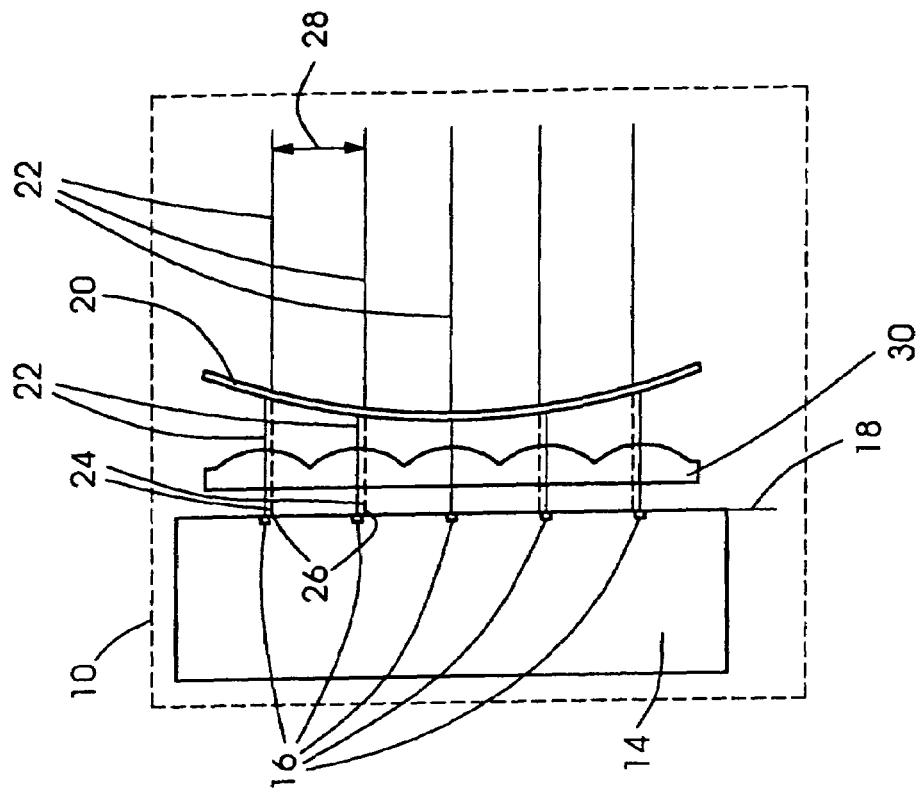
FIGS. 1A and 1B are diagrammatic, illustrations of two embodiments of micro optics according to the invention.
Figure 1B:
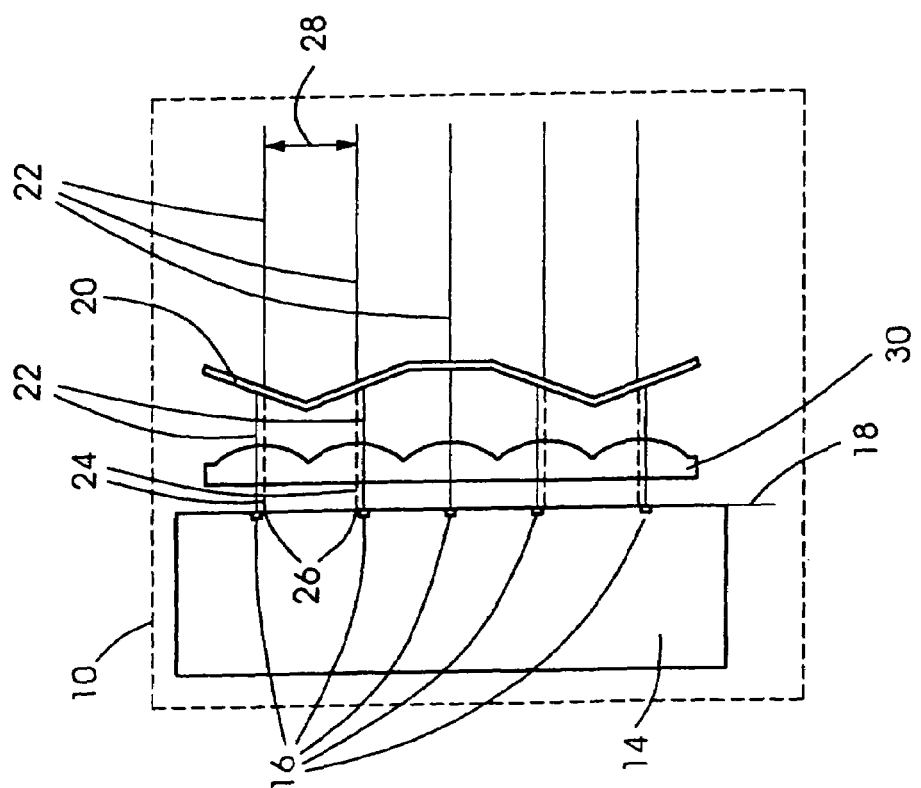

Referring now to the figures of the drawing in detail and first, particularly, to FIGS. 1A and 1B thereof, there is shown a schematic illustration of two embodiments of a device 10 according to the invention for imaging a printing form, containing micro optics 30. In FIGS. 1A and 1B, the imaging device 10 has a laser diode bar 14 as shown. Without restricting the general number of laser diodes 16 on an advantageous laser diode bar 14, in each case five laser diodes 16 can be seen in this illustration. The laser diodes 16 lie in a row, substantially along line 18, a straight path, on the laser diode bar 14. Therefore, ideally, the laser diodes 16 lie exactly on the line 18 but, in reality, each laser diode 16 has a positional deviation (in particular an individual deviation) in relation to the line. In particular, as can also be seen in FIGS. 1A and 1B, the laser diodes 16 are spaced nonuniformly, that is to say have a nonuniform positional deviation from the ideal or the desired position. The courses 22 of light beams emitted by the laser diodes 16 lie substantially in an emission plane and are propagated substantially parallel to one another. After emerging from the laser diode bar 14, the light beams pass through the micro optics 30 belonging to imaging optics for correcting the emission divergence or for shaping the laser beams emerging nonuniformly divergently as a result of the configuration. Imaging optics of this type also contain a cylindrical lens, shown neither in FIG. 1A or in FIG. 1B, which acts on all the light beams emerging from the laser diode bar 14, and is used to reduce the divergence in the direction at right angles to the emission plane. The micro optics 30 contain a number of lenses in each case acting individually on a light beam, which are integrated into a field or array. Downstream of the micro optics 30, preferably immediately downstream, the device 10 for imaging a printing form 12 contains an optical correction element 20, which effects uniform spacing at the intended spacing 28 of the light beams in their further course 22, in that, if appropriate, a necessary offset of a specific amount is induced in the course of each beam. The intended spacing 28 is preferably a multiple of the spacing of closely located printing dots (minimum printing dot spacing) which are produced on the printing form by the image points of the laser beams.

In FIG. 1A, the optical correction element 20 has the form of a plate with parallel surfaces and planar sections in some portions with different angles of inclination with respect to the propagation direction of the light beams passing the sections. The inclination of the planar sections is such that light beams emerging from the plate have uniform spacings from one another at the intended spacing 28, although light beams entering have a nonuniformly different spacings from one another. If the light beams being propagated along courses 22 downstream of the optical correction element 20 are lengthened rearward, as indicated by virtual courses 24 shown dashed, then the light beams appear to come from virtual laser diodes on the laser diode bar 14 whose positions 26 are positioned uniformly on the laser diode bar 14.

In FIG. 1B, the optical correction element 20 has the form of a plate with parallel surfaces and a curvature with a sign over the entire course. The curvature is so low that the action on an incident beam corresponds to that of a plane-parallel plate which is inclined at the local tangential angle with respect to the propagation. The curvature of the plate is such that the local inclination of the plate for each light beam is just so high that light beams emerging from the optical correction element 20 have uniform spacings from one another at the intended spacing 28, although light beams entering have nonuniformly different spacings from one another. As already applies to the embodiment shown in FIG. 1A, it is also true of that in FIG. 1B, that the light beams appear to come from virtual laser diodes on the laser diode bar 14 whose positions 26 are positioned uniformly on the laser diode bar 14 if the light beams being propagated along the courses 22 downstream of the optical correction element 20 are lengthened rearward, as indicated by the virtual courses 24 shown dashed.

Figure 2:
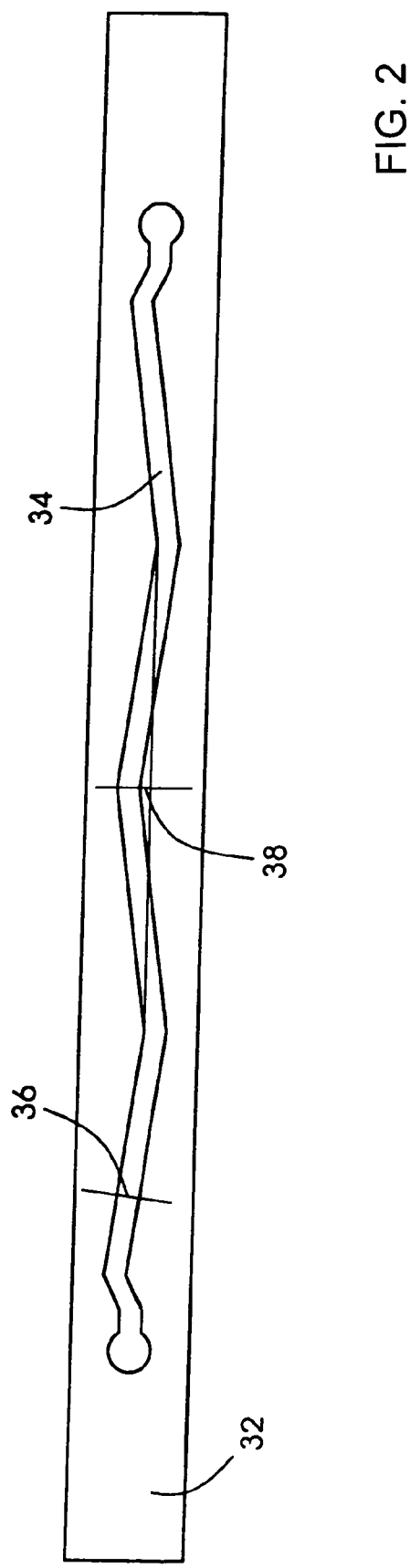
FIG. 2 is a diagrammatic, plan view of a holder for an optical correction element in an advantageous embodiment of the invention.

FIG. 2 shows a plan view of a holder 32 for the optical correction element 20 in an advantageous embodiment of the invention. The holder 32 is fabricated from a metallic material, for example aluminum, or a polymer. It has a slot-like recess or slot-like incision in order to hold the optical correction element 20, here a clamped glass plate 34. The thickness 36 of the slot is configured such that the action of a force is exerted on the glass plate 34 by the holder 32 for the purpose of clamping. For example, the thickness 36 is 0.5 mm. By the course of the slot, the glass plate 34 has a course impressed on it. The course is chosen or provided so as to be suitable to compensate for the present pitch error. The amplitude 38 of the clamping is determined by the differential distance of the points of inflection of the course in relation to a long side edge parallel to the course and is, for example, 0.2 millimeter.

Figure 3B:
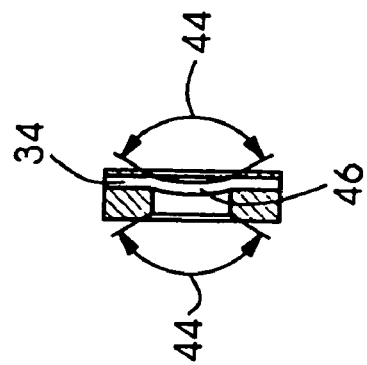
FIG. 3B is a diagrammatic, sectional view taken along the line IIIB-IIIB shown in FIG. 3A.
Figure 3A:
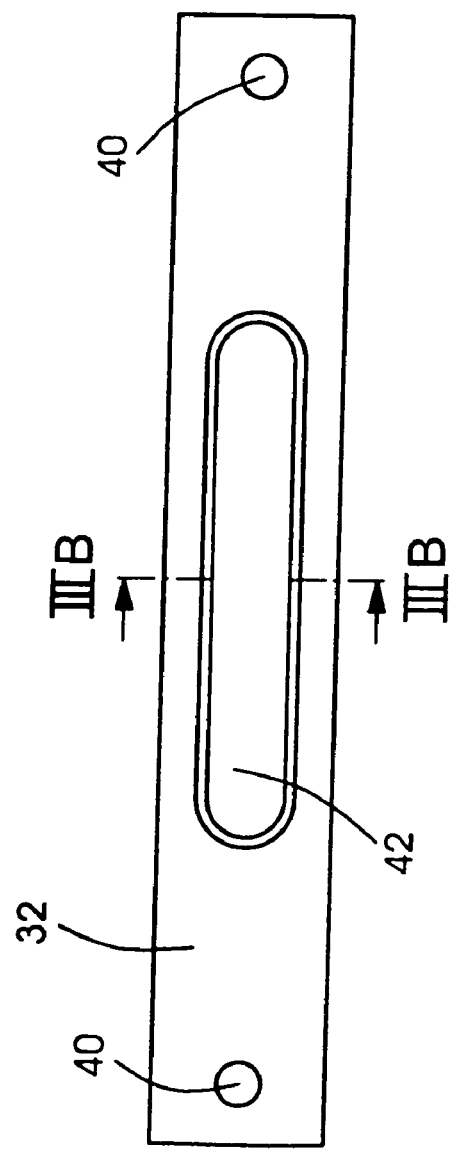
FIG. 3A is a diagrammatic view of the holder illustrated in FIG. 2.

FIG. 3A is schematic view and FIG. 3B is a sectional of the holder 32 illustrated in FIG. 2. In the vicinity of its short side edges, the holder 32 has two holes 40, so that the holder 32 can be accommodated in a fixed or static manner by screws in an imaging device. The optical correction element 20 in its holder 32 can, for example, be joined to the micro optics, more precisely the holding element of the latter, so that accurate positioning is carried out at the same time. The optical correction element 20 in the holder 32 can be reached and passed by light beams through windows 42. The long axis of the stadium-shaped window lies in or parallel to the emission plane of the laser beams from a laser diode bar. FIG. 3B shows a section taken along the line IIIB-IIIB shown in FIG. 3A. The windows 42 have opening angles 44 of about 120 degrees. The glass plate 34 is clamped in the holder 32 in such a way that, in addition to the planar course in some portions already described, it also has a slight curvature at right angles to the emission plane of the laser diodes.

FIG. 4 relates schematically to the topology of the employment or the use of the invention in a printing form exposer 48. A familiar embodiment of a printing form exposer 48 contains one or more devices 10 for imaging the printing form 12, which is held on a cylinder 50 in order to be imaged. The device 10 is of compact construction in modular form and, according to the invention, in addition to the laser diode bar 14 (also having micro optics 30, as already mentioned further above), contains the optical correction element 20 and downstream imaging optics 56 (macro optics) for imaging the beams from the laser diode bar 14 in a row 60 of image points 58 on the printing form 12 without overlapping. Here, the image points 58 form a row of mutually independent imaging channels. The macro optics are preferably imaging optics as described and disclosed to the public in published, non-prosecuted German patent application DE 102 33 491 A1, corresponding to U.S. patent disclosure No 2004-0136094 A1. In the row 60 on the printing form 12, the image points 58 are spaced uniformly. The row 60 runs substantially straight and parallel to the axis of rotation of the cylinder 50.

In interaction between the rotation of the cylinder in the direction of rotation 52 and the displacement of the imaging device 10 in the translational direction 54, the image points 58 follow helical tracks along the paths 62. From the prior art, for example from published, nonprosecuted German patent application DE 100 31 915 A1, corresponding to U.S. Pat. No. 6,784,912 B2, forward movement rules are known relating to how large the stroke or pitch of the helical tracks must be as a function of the number of image points and their spacings from one another, in order that the two-dimensional area of the printing form can be written closely with printing dots without scanning points repeatedly on the printing form. The laser diodes of the laser diode bar 14 are configured such that they can be activated individually, so that, in each of the number of imaging channels, by the image points of the laser diodes, printing dots of different intensity can be produced in accordance with a subject to be imaged or an item of image information to be imaged.

Not illustrated by drawing is the use of the device 10 according to the invention for imaging the printing form 12 in a printing unit, in particular an offset printing form in an offset printing unit of a press. Such a use is, however, preferably carried out with the same topology as shown in FIG. 4 for a printing form exposer. In the case of an embodiment of a printing unit according to the invention, the cylinder 50 is a printing form cylinder, on which the printing form is held first for imaging and second for printing.

This application claims the priority, under 35 U.S.C. § 119, of German patent application No. 10 2005 007 459.6, filed Feb. 18, 2005; the entire disclosure of the prior application is herewith incorporated by reference.

We claim:

1. A device for imaging a printing form, the device comprising:
    at least one laser diode bar having a number of laser diodes disposed in a row with nonuniform positional deviation along a straight line in a direction of said row of said laser diodes, an actual spacing of positions projected along a perpendicular onto said line of two adjacent said laser diodes differing from an intended spacing; and
    at least one optical correction element for changing at least one course of a light beam emitted by one of said adjacent laser diodes, said optical correction element changing the at least one course such that, downstream of said optical correction element, beam courses of emitted light beams from said two adjacent laser diodes are the courses of two light beams from adjacent virtual laser diodes whose positions projected along the perpendicular onto said line have a different or other spacing along said line, which have a smaller deviation in relation to the intended spacing than the actual spacing or is equal to the intended spacing.

2. The device for imaging the printing form according to claim 1, wherein said optical correction element acts on the courses of the emitted light beams from at least two said laser diodes or all of said laser diodes on said laser diode bar.

3. The device for imaging the printing form according to claim 1, wherein said optical correction element is selected from the group consisting of static optical correction elements and dynamic optical correction elements.

4. The device for imaging the printing form according to claim 1, further comprising imaging optics disposed between said laser diode bar and said optical correction element, said imaging optics correcting emission divergence of said laser diodes.

5. The device for imaging the printing form according to claim 4, wherein said imaging optics for correcting the emission divergence have an array of micro lenses, in each case one of said micro lenses acting on an emitted beam from one of said laser diodes, said micro lenses containing a cylindrical lens acting on all the emitted beams from said laser diodes of said laser diode bar.

6. The device for imaging the printing form according to claim 1, wherein said optical correction element includes a holder and a glass plate clamped in said holder.

7. The device for imaging the printing form according to claim 1, wherein said optical correction element has a simple curvature or a course of a curvature having sections of different sign of the curvature or planar sections in some portions.

8. The device for imaging the printing form according to claim 1, wherein said optical correction element acts in each case on a course of the emitted light beam as a plane-parallel plate.

9. The device for imaging the printing form according to claim 1, wherein said optical correction element corrects at least one component of a nonlinear spacing deviation, said at least one component being an approximation to a spacing deviation by a simple functional relationship or an approximation of leading order.

10. The device for imaging the printing form according to claim 1, further comprising imaging optics connected downstream of said optical correction element to image the beams from said laser diode bar in a row of image points on the printing form.

11. The device for imaging the printing form according to claim 10, wherein the printing form is held on a cylinder or is formed by a circumferential surface of the cylinder, and in that the row of image points has an angle different from 90 degrees with respect to a direction defined by a cylinder axis.

12. A printing form exposer, comprising:
    at least one imaging device containing:
        at least one laser diode bar having a number of laser diodes disposed in a row with nonuniform positional deviation along a straight line in a direction of said row of said laser diodes, an actual spacing of positions projected along a perpendicular onto said line of two adjacent said laser diodes differing from an intended spacing; and
        at least one optical correction element for changing at least one course of a light beam emitted by one of said adjacent laser diodes, said optical correction element chancing the at least one course such that, downstream of said optical correction element, beam courses of emitted light from said two adjacent laser diodes are the courses of two light beams from adjacent virtual laser diodes whose positions projected along the perpendicular onto said line have a different or other spacing along said line, which have a smaller deviation in relation to the intended spacing than the actual spacing or is equal to the intended spacing.

13. A printing unit, comprising:
    at least one imaging device containing:
        at least one laser diode bar having a number of laser diodes disposed in a row with nonuniform positional deviation along a straight line in a direction of said row of said laser diodes, an actual spacing of positions projected along a perpendicular onto said line of two adjacent said laser diodes differing from an intended spacing; and
        at least one optical correction element for changing at least one course of a light beam emitted by one of said adjacent laser diodes, said optical correction element changing the at least one course such that, downstream of said optical correction element, beam courses of emitted light from said two adjacent laser diodes are the courses of two light beams from adjacent virtual laser diodes whose positions projected along the perpendicular onto said line have a different or other spacing along said line, which have a smaller deviation in relation to the intended spacing than the actual spacing or is equal to the intended spacing.

14. A press, comprising:
    a printing unit containing at least one imaging device, the at least one imaging device, containing:
        at least one laser diode bar having a number of laser diodes disposed in a row with nonuniform positional deviation along a straight line in a direction of said row of said laser diodes, an actual spacing of positions projected along a perpendicular onto said line of two adjacent said laser diodes differing from an intended spacing; and at least one optical correction element for changing at least one course of a light beam emitted by one of said adjacent laser diodes, said optical correction element changing the at least one course such that, downstream of said optical correction element, beam courses of emitted light from said two adjacent laser diodes are the courses of two light beams from adjacent virtual laser diodes whose positions projected along the perpendicular onto said line have a different or other spacing along said line, which have a smaller deviation in relation to the intended spacing than the actual spacing or is equal to the intended spacing.

* * * * *